United States Patent Office 3,306,909
Patented Feb. 28, 1967

3,306,909
3-CARBAMOYL-1,5-DIPHENYL-2,4-
PYRROLIDINEDIONES
Robert H. Uloth, Evansville, Ind., assignor to Mead Johnson & Company, Evansville, Ind., a corporation of Indiana
No Drawing. Filed May 5, 1964, Ser. No. 365,192
4 Claims. (Cl. 260—326.3)

This invention relates to novel compositions and synthetic methods and more particularly to 3-carbamoyl-1,5-diphenyl-2,4-pyrrolidinediones, methods and intermediates for preparing the same, and novel therapeutic processes utilizing these compounds.

The compounds of this invention have the following structural formula:

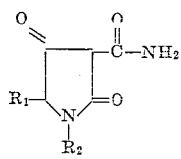

wherein $R_1$ and $R_2$ are independently selected from the group consisting of phenyl, halophenyl, alkoxyphenyl, alkylphenyl and hydroxyphenyl. Suitable substituents include chlorophenyl, methoxyphenyl, ethoxyphenyl, tolyl, ethylphenyl and isopropylphenyl. The alkyl and alkoxy substituents of the phenyl groups contain up to about 4 carbon atoms.

The compositions of this invention are useful as mammalian diuretics and particularly as compounds which have the capacity to induce diuresis in mammals without causing potassium depletion or elevation of blood glucose levels. A further advantage is that the compounds of this invention also exhibit uricosuric activity. The compounds may be administered to mammals at dosages of from 0.5 to 25 milligrams per kilogram of body weight. They may be administered orally in the form of tablets, capsules or in a suitable liquid form such as an elixir or syrup.

The compounds of this invention are prepared by a novel synthesis which involves formation of an α-anilinophenylacetic acid ester, cyanoacetylation to form a 2-(N-phenylcyanoacetamido) phenylacetic acid ester, which is in turn submitted to Dieckmann cyclization and hydrolysis.

The α-anilinophenylacetic ester may be prepared from esters of α-halo-α-phenylactic acid by the following procedure:

(A)

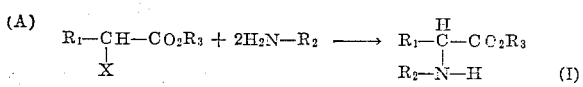

wherein X is a halogen such as bromine or chlorine and $R_3$ is lower alkyl containing up to about 4 carbon atoms, and $R_1$ and $R_2$ are phenyl or substituted phenyl as previously defined.

The resulting α-anilinophenylacetic ester is converted to the corresponding cyanoacetanilide by reaction with cyanoacetyl chloride prepared by the methods described by Schroeter et al. Ber. 71B, 671 (1938) and Weissberger et al. J.A.C.S. 65, § 2 (1943) by the procedure of the following equation:

(B)

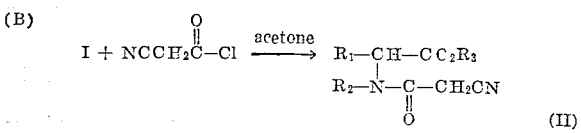

The product II 2-(N-phenylcyanoacetamido) phenylacetic acid ester is subjected to a Dieckmann condensation and the resulting 3-cyano-1,5-diphenyl-2,4-pyrrolidinedione (III) hydrolyzed to give the final product (IV) as shown in the following equations:

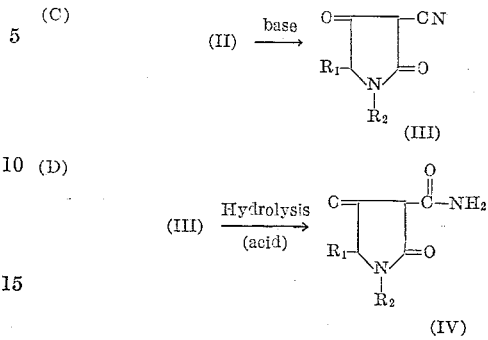

Compounds (II) and (III) are novel intermediates useful in the preparation of the compositions of this invention (IV) and form a part of this invention. Compound (III) also has anti-inflammatory and muscle relaxant properties.

The Dieckmann condensation, Equation D, is carried out in the conventional manner using a base such as sodium ethoxide, sodium methoxide, potassium ethoxide, sodium hydride, lithium hydride, sodium amide or the like. Anhydrous conditions are preferred. The media may be a variety of organic solvents such as alcohols, ethers, hydrocarbons or the like. The hydrolysis of the condensation product is preferably carried out using mild acid conditions such as aqueous polyphosphoric acid solution. The temperature of hydrolysis should be from about 50° C. to about 150° C.

The foregoing method may be more readily understood by reference to the following examples illustrating the preparation of the novel intermediates and final products.

EXAMPLE I

A. *Ethyl-2-chlorophenylacetate.*—Mandelic acid (304 g., 2.0 mole) is added portionwise (over a one and one-half hour period) to a stirred suspension of phosphorus pentachloride (832 g., 4.0 mole) in 1.3 liters of carbon tetrachloride contained in a 5-liter flask, while maintaining a reaction temperature of 55–65° C. After refluxing for one hour, the solvent, phosphorus oxychloride and hydrogen chloride, are removed in vacuo at a pot temperature of 50–60° C.

The residue is taken up in 500 milliliters of benzene and filtered through a sintered glass funnel removing a small quantity of unreacted phosphorous pentachloride. After concentration, the crude yellow 2-chlorophenlacetyl chloride is esterified by addition to 1.5 liters of absolute ethanol in 0.5 hour with ice-water cooling at 50–60° C. When concentrated and distilled through a six inch Vigreaux column, a clear colorless lachrymatory liquid was obtained, yield 202 grams (78%), boiling point 115–121° C. per 8 mm.; $n_D^{20}$ 1.4876.

B. *Ethyl 2-anilinophenylacetate.*—A mixture of ethyl 2-chlorophenylacetate (119 grams, 0.6 mole) and 111.5 grams (1.2 mole) of aniline is heated on a steam bath for 4.5 hours. The hot melt is poured into 1.5 liters of ice water where it solidifies, yielding 113 grams (74%) M.P. 75–82° C.; after two crystallizations from ethanol (1 g./3 ml.), 82 g. (54%), M.P. 83.5–85.5° C.

C. *Cyanoacetyl chloride.*—Chlorine (71 g., 1.0 mole) is added to an ethereal solution (500 ml.) of water-free cyanoacetic acid (85.1 g., 1.0 mole) and phosphorous trichloride (137.4 g., 1.0 mole) at such a rate (1.5 hour) that the temperature is kept at 3–4° C. by cooling in an ice-salt bath. Concentration of the clear solution in vacuo using a water bath temperature not greater than 65° C. provides a yellow residue which is distilled through a six inch Vigreaux column, yield 40.5 g. (39.0%), B.P. 73–75° C./8 mm.

D. *Ethyl - 2 - (N - phenylcyanoacetamido)phenylacetate.*—Crude cyanoacetyl chloride (41.5 g., 0.4 mole) dissolved in 200 ml. of acetone is added dropwise to an acetone (800 ml.) solution of ethyl 2-anilinophenylacetate (76.5 g., 0.3 mole) and triethylamine (40.5 g., 0.4 mole) maintaining the temperature below 30° C. by cooling. The precipitated triethylamine hydrochloride is collected and the filtrate concentrated. The dark oil concentrate when stirred with Skelly B provides an insoluble dark orange solid which is collected and washed first with water (1.5 liters) and then with 300 ml. of 50% ethanol. The tan filter-cake is extracted with hot Skelly B (800 ml.) and the remaining solid crystallized from 350 ml. of ethanol (Darco treatment) affording white ethyl 2-(N-phenylcyanoacetamido)phenylacetate, yield 31.5 g. (31.6%), M.P. 115.5–117° C.

Recovered ethyl 2-anilinophenylacetate (from the cooled Skelly B extract) amounted to 33.5 g. (44%) M.P. 76.5–83° C.

E. *3 - cyano - 1,5-diphenyl-2,4-pyrrolidinedione.*—A mixture of ethyl 2-(N-phenylcyanoacetamido)phenylacetate (47 g., 0.46 mole) ethanolic sodium ethoxide (prepared from 3.36 g. 0.146 g. atom, of sodium in 200 ml. of absolute ethanol) and 60 ml. of benzene, is refluxed for 7 hours.

The sodium salt of 3-cyano-1,5-diphenyl-2,4-pyrrolidinedione which precipitates on standing is collected and washed with ether yielding 42.5 g. (97.5%) of white solid. The salt is taken up in 1 liter of water and acidified with 1 N hydrochloric acid precipitating the 2,4-pyrrolidinedione (33.5 g., 83%) which was crystallized from 250 ml. of isopropanol and then from benzene, yield 26 g. (65%), M.P. 207–208° C. (dec.).

F. *3 - carbamoyl-1,5-diphenyl-2,4-pyrrolidinedione.*—A suspension of 3-cyano-1,5-diphenyl-2,4-pyrrolidinedione (11.05 g., 0.043 mole) in 250 ml. of polyphosphoric acid is heated on a steam bath for 1 hour. The orange colored solution is poured over 1.5 liters of crushed ice and the yellow solid obtained washed with 100 ml. of 50% isopropanol, yield 10.4 g. (89%), M.P. 176–181° C. Two crystallizations from isopropanol (1 g./135 ml.) gives 6.5 g. (55%) of analytically pure product, M.P. 186–187° C. This compound may be readily converted to the sodium salt by dissolving in dilute aqueous sodium hydroxide, in which it is soluble to the extent of 26 milligrams per milliliter of 0.1 N solution.

The process as shown in the preceding example may also be carried out using the bromine analog of ethyl 2-chlorophenylacetate. The synthesis of this material from ethyl 2-phenyl acetate is as follows:

G. *Ethyl 2-bromophenylacetate.*—A mixture of ethyl phenylacetate (820 g., 5.0 moles M.C.B.) and N-bromosuccinimide (890 g., 5.0 moles, Arapahoe) in 5.5 liters of carbon tetrachloride is refluxed with stirring for 40 hours. The succinimide by-product is collected and washed with carbon tetrachloride. Concentration of the combined filtrate and washings and distillation of the residue through a Claisen head affords, after a 133 g. forerun, ethyl 2-bromophenylacetate, 919 g. (76%), B.P. 130–135° C./9 mm.

EXAMPLE II

*3-carbamoyl-1-(4-methylphenyl)-5-phenyl-2,4-pyrrolidinedione*

This compound is prepared by substitution of 128.5 grams (1.2 mole) of p-toluidine for aniline in step B of Example I and thereafter following the procedure of steps D, E, and F of that example.

EXAMPLE III

*3-carbamoyl-1-(3,4-diethylphenyl)-5-phenyl-2,4-pyrrolidinedione*

The procedure of Example I–B is followed, replacing aniline with 179 grams (1.2 mole) of 3,4-diethylaniline. The crude ethyl 2-(3,4-diethylaniline)phenyl acetate is treated in accordance with the procedure of Examples I–D, E and F to give the desired product.

EXAMPLE IV (INTERMEDIATE)

*3-carbamoyl-1-(3-benzyloxyphenyl)-5-phenyl-2,4-pyrrolidinedione*

This compound is prepared by following the procedure of Examples I–B, D, E and F, replacing the aniline in step B with 238.8 grams (1.2 mole) of 3-benzyloxyaniline.

The hydroxyphenyl derivatives of the compounds of this invention should be prepared by techniques which protect the hydroxyl hydrogen from reaction with the cyanoacetyl in the reaction set forth in the procedure of Example I–D. The following example illustrates this procedure.

EXAMPLE V

*3-carbamoyl-1-(3-hydroxyphenyl)-5-phenyl-2,4-pyrrolidinedione*

3 - carbamoyl - 1 - (3-benzyloxyphenyl)-5-phenyl-2,4-pyrrolidinedione (see Example IV), 0.1 mole, in 250 ml. of methanol is debenzylated by low pressure hydrogenation using 1.0 g. of a 10% palladium-on-charcoal catalyst until 0.1 mole of hydrogen is absorbed to provide 3 - carbamoyl-1-(3-hydroxyphenyl)-5-phenyl-2,4-pyrrolidinedione.

EXAMPLE VI

*3-carbamoyl-1-phenyl-5-(p-bromophenyl)-2,4-pyrrolidinedione*

This compound is prepared following the procedure set forth in Example I, substituting however 462 grams (2.0 moles) of p-bromomandelic acid for mandelic acid in step I–A.

EXAMPLE VII

*3-carbamoyl-1-phenyl-5-(p-ethoxyphenyl)-2,4-pyrrolidinedione*

This compound is prepared by the procedure of Example I substituting however 392 grams (2.0 moles) of p-ethoxymandelic acid for mandelic acid in step I–A.

EXAMPLE VIII

*3-carbamoyl-1-(p-chlorophenyl)-5-phenyl-2,4-pyrrolidinedione*

This compound is prepared by following the procedure of Example I substituting however, in part B thereof, 127 grams (0.6 mole) of propyl 2-chlorophenylacetate and 152 grams (1.2 mole) of p-chloroaniline for the reactants therein noted. The crude propyl 2-(p-chloroanilino) phenylacetate resulting from the reaction following step I–B is treated as in step I–D with cyanoacetyl chloride to produce propyl 2-(N-p-chlorophenylcyanoacetamido) phenyl acetate which is then treated by the procedures of steps E and F of Example I to produce the 3-carbamoyl-1-(p-chlorophenyl)-5-phenyl-2,4-pyrrolidinedione.

While the preceding examples illustrate the preparation of a number of compounds of the present invention, it should be understood that many others can be made by the foregoing process using a variety of starting materials so selected as to provide the desired substituents in the groups identified as $R_1$ and $R_2$.

As indicated in the foregoing, the compounds of the present invention may be administered in a variety of forms. The compositions in dosage form should be such as to provide a daily dose of from about 50 to 600 milligrams. The following specific examples illustrate a pharmaceutical composition in dosage unit form.

EXAMPLES IX, X AND XI

*Formulation of tablets*

3-carbamoyl-1,5-diphenyl-2-4-pyrrolidinedione was formulated into tablets as indicated in the following table. Each example is for the preparation of 1000 tablets at various dosage levels.

| Example | IX | X | XI |
|---|---|---|---|
| Dosage per tablet (mg.) | 100 | 200 | 300 |
| Ingredients: | | | |
| Lactose (grams) | 85 | 170 | 255 |
| Starch (grams) | 10 | 20 | 30 |
| Magnesium Stearate (powder) (grams) | 5 | 10 | 15 |
| 3-carbamoyl-1,5-diphenyl-2,4-pyrrolidinedione (grams) | 100 | 200 | 300 |
| Total Weight (grams) | 200 | 400 | 600 |

3-carbamoyl-1,5-diphenyl-2,4-pyrrolidinedione and lactose are blended in a suitable granulating mixer. The dry blended mixture is wet-granulated using the starch in the form of a starch paste. The wet granulation is screened and dried on trays in a forced air oven. The dried granulate is screened and blended with magnesium stearate. The granulation is tableted in a conventional manner at the proper weight to give the unit dosage as bisected tablets.

The foregoing compositions are, as indicated, useful in the inducing of diuresis in a mammalian host. Ordinarily diuretics have a kaluretic effect, which results in potassium depletion of the host undergoing treatment. One advantage of the present therapeutic method is that potassium excretion is minimized. A further problem associated with diuretics is the tendency for the blood glucose levels to elevate during diuretic treatment. Another advantage of the therapeutic method using these compounds is that the glucose levels are stabilized or maintained to a much greater degree. A further advantage in using the diuretics of the present invention is the concomitant uricosuric effect on the mammalian host which is useful in the treatment of gout.

The compounds of this invention may be prepared in the form of pharmaceutically acceptable metal salts, such as the sodium, potassium, calcium, magnesium, and zinc salts. They can be prepared by neutralization with the corresponding base or by other appropriate well known procedures.

From the foregoing it may readily be appreciated that the present compounds provide an unusual means of inducing diuresis in a host, coupled with a number of other beneficial pharmacological effects.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

I claim:
1. A composition of the formula

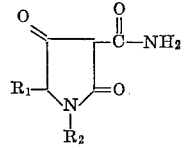

wherein $R_1$ and $R_2$ are independently selected from the group consisting of phenyl, halophenyl, alkoxyphenyl, alkylphenyl and hydroxyphenyl wherein the alkyl and alkoxy substituents of the phenyl groups contain up to 4 carbon atoms.

2. 3-carbamoyl-1,5-diphenyl-2,4-pyrrolidinedione.

3. 3-carbamoyl-1-phenyl-5-(3-bromophenyl)-2,4-pyrrolidinedione.

4. 3-carbamoyl-1-(3,4-diethylphenyl)-5-phenyl-2,4-pyrrolidinedione.

References Cited by the Examiner

UNITED STATES PATENTS

| | | | |
|---|---|---|---|
| 1,915,334 | 6/1933 | Salzberg et al. | 260—243 |
| 2,075,359 | 3/1937 | Salzberg et al. | 167—22 |
| 2,897,209 | 7/1959 | Kodras | 260—326.3 |
| 2,901,489 | 8/1959 | Allen et al. | 260—326.3 |
| 2,906,772 | 9/1959 | Weijlard | 260—465 |
| 2,926,187 | 2/1960 | Russell | 260—465 |
| 3,076,816 | 2/1963 | Miller | 260—326.5 |
| 3,080,377 | 3/1963 | Liao | 260—326.5 |

OTHER REFERENCES

Fieser et al., Advanced Organic Chemistry, (1961), pp. 580–82. Noller, Chemistry of Organic Compounds, (1957), page 253.

ALEX MAZEL, *Primary Examiner.*

J. A. NARCAVAGE, J. TOVAR, *Assistant Examiners.*